(12) United States Patent
Powell

(10) Patent No.: US 9,015,300 B2
(45) Date of Patent: Apr. 21, 2015

(54) METHOD, COMPUTER PROGRAM PRODUCT, AND DEVICE FOR NETWORK RECONNAISSANCE FLOW IDENTIFICATION

(75) Inventor: Carl Marshall Eliot Powell, Gaithersburg, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1935 days.

(21) Appl. No.: 11/551,453

(22) Filed: Oct. 20, 2006

(65) Prior Publication Data
US 2008/0147792 A1    Jun. 19, 2008

(51) Int. Cl.
*G06F 15/173* (2006.01)
*H04L 29/06* (2006.01)

(52) U.S. Cl.
CPC ............. *H04L 63/1433* (2013.01); *H04L 63/20* (2013.01); *H04L 63/1408* (2013.01)

(58) Field of Classification Search
USPC .................................................. 709/223, 204
See application file for complete search history.

(56) References Cited

U.S. PATENT DOCUMENTS 6,742,128 B1 * 5/2004 Joiner ............................ 726/25
7,013,333 B1    3/2006 Skells
7,506,360 B1 * 3/2009 Wilkinson et al. ................. 726/3
2006/0018466 A1 * 1/2006 Adelstein et al. ................ 380/46
2007/0157306 A1 * 7/2007 Elrod et al. ..................... 726/14
2007/0271360 A1 * 11/2007 Sahita et al. .................. 709/223

OTHER PUBLICATIONS

"Proactive and predictive Information Assurance for Next Generation Systems (P2INGS)", Department of the Air Force, Air Force Materiel Command, Apr. 8, 2003.

* cited by examiner

*Primary Examiner* — Joseph E Avellino
*Assistant Examiner* — Marshall McLeod

(57) ABSTRACT

A method, computer program product, and device for detecting a reconnaissance of a network through the identification of the information flowing from the network to external sources are provided. The method may include monitoring the information flowing from the network to external sources in order to identify what properties may have been revealed to a potential attacker. The method may include monitoring a response of the network to an inquiry from an external source, determining potential properties of the network that may have been revealed from the response, storing the potential properties in a data repository, and determining a possible reconnaissance of the network based on the properties stored in the data repository. Determining the potential properties of the network revealed by the response may include comparing the response to one or more information templates. Each information template may be associated with one or more properties of the network.

19 Claims, 2 Drawing Sheets

Figure 1:
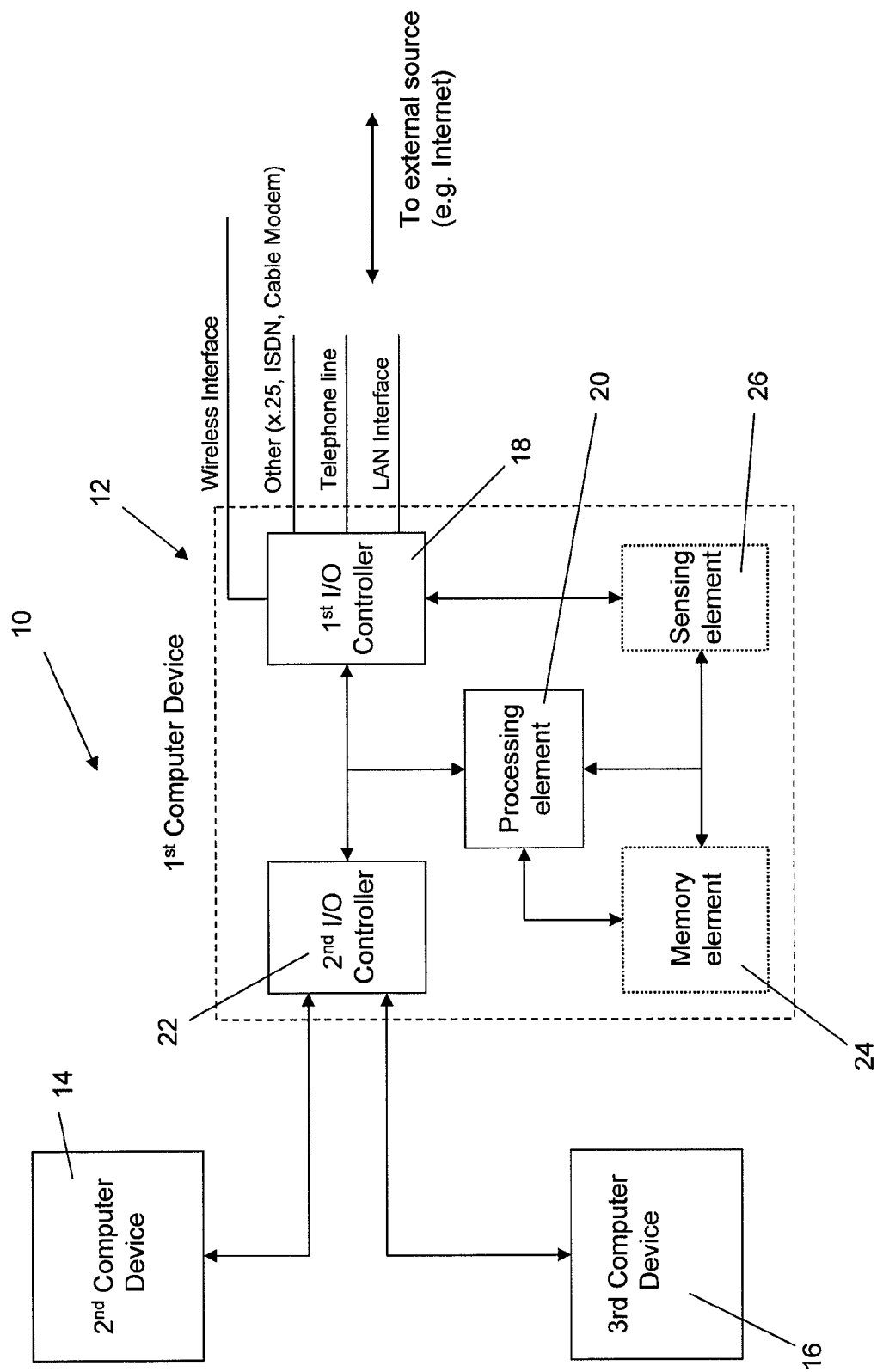

METHOD, COMPUTER PROGRAM PRODUCT, AND DEVICE FOR NETWORK RECONNAISSANCE FLOW IDENTIFICATION

BACKGROUND OF THE INVENTION

Attacks on a network system may vary from attempts to interfere with or terminate the operability of the network system to unauthorized use or access to network assets or data stored or processed within or by the network system. Regardless of the nature of the attack, the attacker often probes a network system in order to learn as much as possible about the network system and its assets in order to determine potential methods or ways of attacking the network system. Probing the network system as a way of gathering information about the network system is generally referred to as a "network reconnaissance."

Because network reconnaissance is usually a precursor to a network attack, "intrusion detection systems" and other network security devices have been developed to try to detect a network reconnaissance. Some conventional detection systems and security devices rely on probe signatures to identify probes associated with a network reconnaissance. However, a capable attacker can defeat most conventional detection systems and security devices in a number of ways, including disguising the probes so the probes no longer match a probe signature or using "low and slow" techniques to take advantage of the limited temporal view of most conventional detection systems.

BRIEF DESCRIPTION OF THE SEVERAL VIEWS OF THE DRAWING(S)

Figure 2:
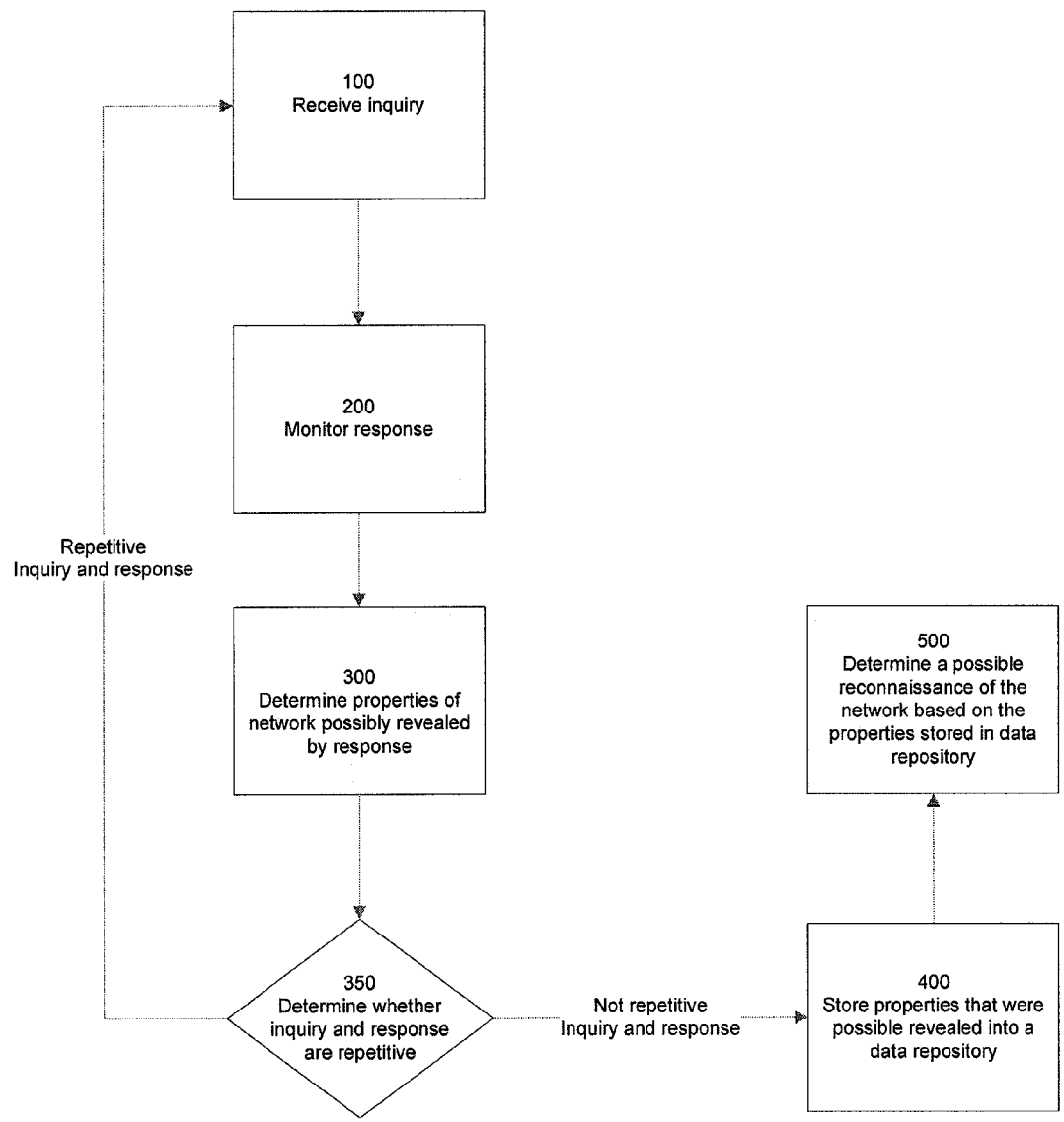

FIG. 1 illustrates a block diagram of an embodiment of the present invention; and FIG. 2 illustrates a flow chart of a method according to another embodiment of the present invention.

DETAILED DESCRIPTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

One or more embodiments of the present invention may be implemented as a method, a device, or a computer program product. Accordingly, an embodiment may take the form of an entirely hardware embodiment, an entirely software embodiment, or an embodiment combining software and hardware aspects. Furthermore, implementations of an embodiment may take the form of a computer program product including a computer-readable storage medium having computer-readable program instructions (e.g., computer software) embodied in the storage medium. More particularly, implementations of the preferred embodiments may take the form of web-implemented computer software. Any suitable computer-readable storage medium may be utilized including hard disks, CD-ROMs, optical storage devices, or magnetic storage devices.

Embodiments of the present invention are described below with reference to block diagrams and flowchart illustrations of methods, devices, systems, and computer program products. It is understood that each block of the block diagrams and flowchart illustrations, and combinations of blocks in the block diagrams and flowchart illustrations, respectively, can be implemented as a computer program product or more specifically by one or more executable portions of the computer program product. The computer program product may be loaded onto a general purpose computer, special purpose computer, or other programmable data processing apparatus to produce a machine, such that the executable portions of the computer program product are executed on the computer or other programmable data processing apparatus and create a means for implementing the functions specified in the flowchart block or blocks.

The computer program product may also be stored in a computer-readable memory that can direct a computer or other programmable data processing apparatus to function in a particular manner, such that the computer program product stored in the computer-readable memory produces an article of manufacture including the executable portions of the computer program product for implementing the one or more functions specified in the flowchart block or blocks. The computer program product may also be loaded onto a computer or other programmable data processing apparatus to cause a series of operations to be performed on the computer or other programmable apparatus to produce a computer-implemented process such that the executable portions that execute on the computer or other programmable apparatus for implementing the functions specified in the flowchart block or blocks.

Accordingly, blocks of the block diagrams and flowchart illustrations support combinations of means for performing the specified functions and program instruction means for performing the specified functions. It is also understood that each block of the block diagrams and flowchart illustrations, and combinations of blocks in the block diagrams and flowchart illustrations, can be implemented by special purpose hardware-based computer systems that perform the specified functions or combinations of special purpose hardware and computer instructions.

In the preferred embodiments referenced herein, a "computer" or "computing device" may be referenced. Such a computer may be, for example, a mainframe, server, desktop, laptop, or a hand held device such as a data acquisition and storage device, or it may be a processing device embodied within another apparatus such as, for example, a set top box for a television system or a wireless telephone. In some instances the computer may be a "dumb" terminal used to access data or processors over a network.

In the preferred embodiments referenced herein, a "network" or "network system" may be referenced. Such a network may be considered for example, a personal area network (PAN), a local area network (LAN), or a wide area network (WAN). The network includes one or more devices, such as computers and peripheral devices. The network is configured to communicate with one or more external devices, systems, or other sources through one or more interfaces. More specifically, one or more of the computers or peripheral devices are configured to receive and/or transmit information to or through an external device, system, or other external source.

For example and as shown in FIG. 1, the network 10 may include a first computer device 12 that is connected to one or more external devices or other external sources and configured to function as a gateway between the one or more external sources and the other computer devices 14, 16 of the network. The first computer device 12 may include at least a first input/output controller 18, a processing element 20, and a second input/output controller 22. In general, the first input/ output controller 18 is configured to receive information from at least one external source through at least one interface 24 and send the information to the processing element 20 and the second input/output controller 22. For example, the first input/output controller 18 may be connected to the Internet through a cable or telephonic modem or a wireless interface or to a second network through a LAN or WAN interface. The processing element 20 is configured to provide instructions to the second input/output controller 22 regarding the handling of the information received through the first input/output controller 18. The second input/output controller 22 routes the information to the computer devices 14, 16 of the network depending on the instructions provided by the processing element 20. The second input/output controller 22 is also configured to receive information from the other computer devices 14, 16 of the network and send the information to the first input/output controller 18 and the processing element 20 for transmission to at least one external source.

The first computer device 12 may be a server and include at least one memory element 24 for storing data and computer instructions related to the application or operability of the network 10 and the processing element 20 may be configured to control or at least regulate at least some operational aspects of the network. As another example, the first computer device may be considered a smart router or, in yet another example, the first computer device may be a dumb router, which is generally a router that is partially dependent on a second computer device for operational aspects.

Also, although generally described herein as a network, it is understood that the network according to some embodiments of the present invention may include only the first computer device. For example, the first computer device may be a home personal computer that is connected to the Internet through a cable modem or other interface.

As used herein, an "interface" is any point between the network and any external source that functions as a conduit between the network and the external source for the transmission of information between the two. For example, an interface may be at a server, firewall, network router, VoIP access devices, or similar network element or device.

Embodiments of the present invention relate to a method of detecting a reconnaissance of a network through the identification of the information flowing from the network to external sources, referred to herein as "Network Reconnaissance Flow Identification." In general, the method includes monitoring the information flowing from the network to determine what properties may have been revealed to a potential attacker.

More specifically, the method may include the monitoring of the information transmitted, i.e. the traffic, between a network and external sources. In operation, the network receives and transmits information to and from external sources. The information may be formatted into packets or blocks of bytes or the information may be transmitted as a series of bytes, characters, or bits alone. A transmission received from an external source by the network through an interface may be referred to as an "inquiry." The inquiry may be part of a routine and authorized operation such as someone sending an email message to an IP address within the network or an authorized user logging in from a remote client device of the network. Or the inquiry may be a probe by a potential attacker trying to obtain information about the network and associated computer devices in order to devise a way for attacking the network. One type of transmission from the network through an interface to an external source is a "response signal" for responding to a particular inquiry. However, depending on the inquiry, the network may not respond to the inquiry with a response signal. In other words, the network may respond to a particular inquiry by the lack of a response signal. An "event" as used herein is considered the combination of a particular inquiry and the response of the network to the inquiry (be it in the form of a response signal or the lack thereof).

According to the embodiment illustrated in FIG. 2, a method for indicating a potential reconnaissance of a network is provided. The method may include receiving an inquiry 100 from an external source; monitoring a response 200 of the network to the inquiry; and determining one or more properties of the network revealed 300 by the response.

As previously described, the network may receive an inquiry from various external sources through one or more interfaces of the network. The external source may be connected to the network through a public system such as the Internet or through a private network. Moreover, an inquiry may include information regarding the external source of the inquiry, such as an IP address, which allows the network to identify the location and type of external source sending the inquiry.

The monitoring of the response may be performed by a sensor. In general, the sensor may be configured to detect at least each response of the network. The sensor may take the form of an entirely hardware embodiment, an entirely software embodiment, or an embodiment combining software and hardware aspects. For example, the sensor may be a software element added to or plugged in for one or more of the interfaces of the network or a separate hardware device connected to one or more of the interfaces. For a more specific example and as illustrated in FIG. 1, the sensor or sensing element 26 may be a separate hardware device within or otherwise in communication with the first computer device 12. The sensing element 26 of the illustrated embodiment is in communication with the first input/output controller 18 for monitoring the traffic between the network 10 and external sources. Moreover, the processing element 20 of the first computer device may provide instructions for the handling of the information detected by the sensing element 26 or other operational aspects of the sensing element 26.

The response is monitored by the sensing element to determine the type or amount of information that is revealed about the network from the response. More specifically, each response signal carries a set of informational elements. The content of an information element may be binary, textual, integer, or any other data format, and may belong to any number of different classes. At least some of the informational elements may not pertain to any characteristics or properties of the network. For example, the response signal may include a header, payload, and trailer. The payload may correspond to the text of an email message which would not help an attacker learn about the network. However, some of the informational elements may pertain to the characteristics or properties of the network. For example, the response signal may include informational elements pertaining to the operating system of the network and more specifically to the version of the operating system, port addresses for particular services of the network, associated protocols of the network, and assets of the network including addresses for the assets and the status of the assets. Such information may be useful to an attacker to learn about the properties of the network in order to devise a method of attacking the network.

In order to determine what information elements may pertain to the characteristics or properties of the network, the response signal may be compared by the sensing element and/or the processing element to one or more information templates. An information template is generally a map for correlating one or more information elements of the response signal to a property of the network that can be inferred from the information elements. For example, an information template may include a set of information elements that if present in the response signal would indicate that a potential attacker may be able to infer a particular property of the network from the response signal. A common presence of a particular set of information elements in the information template and the response signal may be based on the substantially same type of data, regardless of the value, in both the information template and the response signal, or the common presence may be based on the substantially the same type of data having the same values in both the information template and the response signal. As another example, the information template may include a set of information elements combined with a particular hierarchy or hierarchies for the information elements. For example, a hierarchy may include categories of information elements such as elements pertaining to network topology information or operational profile information. The hierarchy may also include types of signals and an indication of the generating source or port of the signal. As a more specific example, the response may be a TCP packet coming from a Web server of the network. The packet might match certain levels in one hierarchy by being a packet from port 80, other levels in other hierarchies by being a TCP packet, and yet other levels in other hierarchies by being an IP datagram. In order to match a particular information template, in this embodiment, the response signal would need to include the information elements in the information template along with the same levels of the hierarchy or hierarchies of the information template.

As yet another example, the basic format of an information template may be a set of rules for determining the presence and values of potential information elements. A rule may be at least one conditional statement that checks for the presence of certain conditions followed by an assignment statement that sets an event bit for that particular value given a particular set of arguments. For example, a response signal may be a datagram (current_packet) and the sensing element may run a set of rules against the values of the datagram. The function 'x(y,z)' may be interpreted as the value of information element x for parameters y and z, such that 'up(10.0.0.1, 192.168,0,15)' may be interpreted as the device at address 10.0.0.1 has revealed that it is up and running to the device at address 192.168.0.15.

For purposes of providing more specific examples, the following may be information elements according to an embodiment of the present invention:

```
# Rule that notes a host is up if it responding with
# any datagram
if current_packet.is_ip
then
    up(current_packet.source, current_packet.destination) = 1;
# Rule that identifies the presence of a Web server being
# revealed
if current_packet.protocol = TCP AND current_packet.src_port = 80
then web_server(current_packet.source, current_packet.destination) = 1;
# Rule that looks at both the Time To Live (TTL) value of the
# current message and a previously set value to determine if
# additional information has been revealed that can be used for
# Operating System fingerprinting. Note that this rule is
# interpreting existing state as part of its function.
if current_packet.ttl > 64 AND
    windows(current_packet.source, current_packet.destination)
then
    windows_2000(current_packet.source,
        current_packet.destination) = 1;
```

As another example, the following may be an information element having a format for a lack of response signal:

```
# See if the previous message had a bad header
# checksum causing the destination to drop it.
# If it did, then the prober has determined that
# it is a class 3 machine for OS fingerprinting
# purposes.
if previous(current_packet).bad_xsum AND
    time_since_previous(current_packet) > 300 ms
then os_class_3(current_packet.destination, current_packet.source);
```

In the above example, "previous" refers to accessing the last response signal from the given source/destination pair and "time_since_previous" refers to the amount of time that has elapsed since the previous packet arrived. As indicated in some of the rules above, some rules may depend on viewing at least some stored state or value, which could be done either in real time or as a post-processing operation.

Information templates may be developed by operators (i.e. human developers) based on historical data, experimentation, and/or the education and experience of the operators. Alternatively, information templates may be developed automatically by the network, computer program product, or device according to embodiments of the present invention.

In general, a particular response signal may be found by the sensing element and/or the processing element to match one or more information templates. The response signal may be considered to reveal each property of the network associated with each of the matching information templates. And the collection of properties revealed from the response signal may be characterized as the information profile for the response signal. The information profile developed by the sensing element and/or processing element for each response signal may be stored into a data repository. More specifically, according to the embodiment illustrated in FIG. 2, the method may further include storing the properties of the network revealed by a response, i.e. the information profile of the response, in a data repository 400. For example, the data repository may be the memory element 24 of the first computer device of the network as illustrated in FIG. 1. Moreover, the processing element 20 of the computer device may provide instructions for determining what information is stored in to the memory element 24.

Furthermore, in some embodiments, the inquiry or information regarding the inquiry that generated the response may also be stored into a data repository. In other words, instead of storing just the response signal, the event, i.e. the inquiry and associated response, may be stored.

Storing the information profiles into the data repository may allow an automated system or an operator to review and analyze all the information profiles to determine the total amount of information or all the properties of the network that has been possibly revealed to an attacker. Alternatively, a subset of the information profiles may be analyzed to sample the properties of the network that may have been revealed to an attacker. More specifically, according to the embodiment illustrated in FIG. 2, the method may further include determining a possible reconnaissance of the network based on the properties stored in the data repository 500. In some embodiments, the data repository may be accessible through a graphic user interface, typically supported by the processing element, to allow an operator to view the stored information profiles.

The processing element 20 may be configured to respond to the data repository reaching a predetermined threshold level of stored information by sending an alarm or an indication of a possible reconnaissance of the network to another element within the network or to an operator. For example, the processing element 20 may generate a pop-up alarm message on one or more monitors of the network or send an alarm email or other message to predetermined addresses or devices. The threshold level may be based on the number of information profiles stored in the data repository. Or the information profiles may categorized, by the sensing element and/or the processing element, based on the types of properties revealed and the threshold level may be based on the number of potential properties revealed and stored in the data repository. In addition to or instead of providing an alarm or an indication of a possible reconnaissance, the processing element 20 may also be configured to take defensive measures such as terminating further communications to one or more external sources in response to the data repository reaching the predetermined threshold level.

According to embodiments of the present invention, the properties of the network that are potentially revealed are principally monitored and not the actual inquires or events that lead to the revealing of the property or properties. Therefore, in some embodiments and as illustrated in FIG. 2, the method may further include collapsing repetitive events into a single event 350. For example, if a user's mail agent queries a mail server every 5 minutes, each of these events would generate the same information profile. In other words the additional queries of the mail server and the response of the mail server would not reveal additional information or properties beyond what was revealed in the first query and response. Thus repetitive events may be collapsed which may save space in the data repository and make the more "abnormal" events more apparent.

For example, according to some embodiments, the stored information profiles in the data repository may represent a list of the properties of the network. The status of each property, i.e. whether the property was potentially revealed or not, may be binary. If the property was potentially revealed the data bit representing the status of the property may be set as 1 and if the property was not potentially revealed the data bit may be set as 0. Therefore, if the sensing element sees the same event a thousand times, then the data bit representing the status of the corresponding property or properties may be set to 1 a thousand times, but no additional storage is needed beyond the single data bit. In such embodiments, the collapsing of the repetitive events occurs automatically by the resetting of the same data bit or bytes instead of storing additional values to represent multiple events.

The collapsing of certain events and the compact nature of information profiles allows for the storage of data for a relative longer period of time compared to conventional intrusion detection systems. The greater temporal aspect of the data stored makes embodiments of the present invention less susceptible to "low and slow" techniques of attackers, i.e. a reconnaissance that intentionally probes the network over a long period of time in efforts to avoid detection.

Also, embodiments of the present invention may have a tool independence aspect due to the reliance on the potential revealed properties of the network rather than the inquiries. In particular, the detection of the reconnaissance is based on the information revealed and not on the inquiries or tools used by the attacker to obtain the information. For example, scanning for active hosts is often performed using an Internet control message protocol (ICMP) echo requests (often referred to as "pings"). But there is no reason that any other IP datagram that generates a response could not be used by an attacker for the same purpose. Embodiments of the present invention allow for the detection of a potential scan of the active host regardless on what tool is used to illicit the response. Moreover, focusing on responses allows embodiments of the present invention to be less susceptible to probes sent by an attacker over a number of different sources.

As mentioned, embodiments of the present invention may also monitor and store the inquiries to the network. As stated above, an event is an inquiry and a response to the inquiry. The response may be a response signal or a lack thereof. Embodiments may monitor events instead of just response signals as described above. Such embodiments allow for the detection of a "lack of response signal" response, which in some applications may reveal a property of the network. Also, even though embodiments of the present invention may be tool independent and not focused on a particular external source, embodiments of the present invention may still store such information for analysis.

Monitoring and storing events allows for a more complete mapping of the information flow into and out of the network. Mapping of the information flow may allow for a better evaluation of the security of the network by using potential probes of an attacker to identify and fix potential flaws in the security. Moreover, the data gathered through the mapping may be analyzed and aggregated by categories such as by external source, web session, volume, and date/time in order to develop an anticipated or expected future map in order to highlight abnormal events or possible probes.

Many modifications and other embodiments of the invention set forth herein will come to mind to one skilled in the art to which these invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method performed by one or more devices, the method comprising:
   receiving, by the one or more devices, an inquiry from an external source to a network;
   monitoring, by the one or more devices, a response of the network to the inquiry;
   determining, by the one or more devices, properties of the network that are revealed to a potential attacker based on the response and one or more information templates,
   determining the properties of the network that are revealed to the potential attacker, based on the response and the one or more information templates, including:
      comparing, by the one or more devices, the response, of the network to the inquiry from the external source, to the one or more information templates to determine the properties,
   at least one of the one or more information templates including information elements that allow the potential attacker to determine the properties of the network,
      the information elements correlating the response to the properties of the network,
      the information elements including:
         information regarding a network topology of the network, and
         a plurality of:
            information regarding an operating system of the network, information identifying one or more protocols of the network, or
information regarding one or more assets of the network;
storing, by the one or more devices, information identifying a first property of the properties of the network in a data repository;
setting, by the one or more devices, a data bit to a particular value,
the data bit corresponding to a second property of the properties of the network,
the data bit being set to the particular value each time the second property is revealed,
information identifying the second property being stored in the data repository prior to receiving the inquiry,
determining, by the one or more devices, a reconnaissance of the network, by the potential attacker, based on the information identifying the first property and the information identifying the second property stored in the data repository;
determining, by the one or more devices, whether an amount of the properties, for which information is stored in the data repository, satisfies a threshold value; and
sending, by the one or more devices and to a device associated with the network, an indication of the reconnaissance of the network, by the potential attacker, when the amount satisfies the threshold value.

2. The method of claim 1, where setting the data bit includes:
determining that the information identifying the second property was stored in the data repository prior to receiving the inquiry; and
setting, the data bit instead of storing the information identifying the second property based on determining that the information identifying the second property was stored.

3. The method of claim 1, further including storing at least a portion of the inquiry in the data repository.

4. The method of claim 1, where the threshold value is based on an amount of information profiles stored in the data repository,
each information profile, of the information profiles, being based on a respective response of a plurality of responses to inquiries received by the network,
the information profiles identifying a plurality of properties of the network.

5. A non-transitory computer-readable medium storing instructions, the instructions comprising:
a plurality of instructions which, when executed by a device, cause the device to:
monitor a response of a network to an inquiry, received by the network, from an external source;
determine properties of the network that are revealed, from the response, to a potential attacker,
one or more instructions, of the plurality of instructions, to determine the properties that are revealed including:
one or more instructions to compare information elements of the response to a plurality of information templates to determine the properties that are revealed,
at least one information template, of the plurality of information templates, including a plurality of information elements,
the plurality of information elements being arranged, in the at least one information template, in a plurality of hierarchies,
the plurality of hierarchies relating to:
a network topology of the network,
a protocol associated with the response from the network, and
a port associated with the response from the network,
at least one hierarchy, of the plurality of hierarchies, including a plurality of categories of information elements,
the one or more instructions to compare the information elements, of the response, to the plurality of information templates including:
one or more instructions to compare the information elements, of the response, to the plurality of hierarchies to determine the properties that are revealed;
store information identifying the properties of the network; and
detect a reconnaissance of the network, by the potential attacker, based on an amount of the properties of the network for which information is stored.

6. The non-transitory computer-readable medium of claim 5, where one or more instructions, of the plurality of instructions, to store the information identifying the properties of the network include:
one or more instructions to determine whether the properties are repetitive with respect to at least one property of the network,
the at least one property being revealed based on another response of the network, prior to the response, to another inquiry from the external source; and
one or more instructions to store the information identifying the properties in a data repository based on determining whether the properties are repetitive.

7. The non-transitory computer-readable medium of claim 5, where the instructions further comprise:
one or more instructions to store at least a portion of the inquiry in a data repository.

8. The non-transitory computer-readable medium of claim 5, where one or more instructions, of the plurality of instructions, to detect the reconnaissance include:
one or more instructions to determine whether the amount of the properties of the network satisfies a threshold value; and
one or more instructions to detect the reconnaissance based on determining that the amount of the properties of the network satisfies the threshold value.

9. A device comprising:
a processing element, implemented at least partially in hardware, to:
compare information elements, of one or more responses from a network to one or more external sources, to information templates,
the information templates correlating the information elements, of the one or more responses, to properties of the network that are revealed based on the one or more responses,
a first information template, of the information templates, including a plurality of information elements,
the plurality of information elements including a plurality of:
information regarding an operating system of the network, information identifying one or snore protocols of the network, or information regarding a topology of the network, a second information template, of the information templates, corresponding to a plurality of rules associated with the one or more responses, the plurality of rules including at least two of:

a first rule that is based on a time to live value a second rule that is based on a header checksum, or a third rule that is based on a protocol and a port, determine, based on comparing the information elements to the information templates, the properties of the network that are revealed by the one or more responses to a potential attacker, store information identifying the properties in a memory element associated with the device, and determine a reconnaissance of the network by the potential attacker based on the information identifying the properties of the network stored in the memory element.

10. The device of claim 9, further comprising:

a sensing element to monitor one or more inquiries, from the one or more external sources to the network, that correspond to the one or more responses, where the processing element is to store, in the memory element, at least a portion of the one or more inquires.

11. The device of claim 9, where at least one of the information templates is associated with at least one of the properties of the network.

12. The device of claim 9, where, when storing the information identifying the properties, the processing element is to:

determine that information identifying a particular property, of the properties, has been stored in the memory element, the information identifying the particular property being stored based on another response of the network, prior to the one or more responses, to an inquiry from the one or more external sources, and set a particular bit, corresponding to the particular property, to a particular value instead of storing the information identifying the particular property based on determining that the information identifying the particular property has been stored in the memory element, the particular pit being set to the particular value each time the particular property is revealed.

13. The device of claim 9, where, when determining the reconnaissance of the network, the processing element is to:

determine whether an amount of the properties, for which information is stored in the memory element, satisfies a threshold level, and determine the reconnaissance of the network, by the potential attacker, based on determining whether the amount of the properties satisfies the threshold level.

14. The device of claim 9, where the processing element is further to:

determine that at least one information element, in at least one of the one or more responses, is included in at least one of the information templates, and determine an inference, of at least one particular property of the network, by the potential attacker based on the at least one information element being included in the at least one of the information templates.

15. The non-transitory computer-readable medium of claim 8, where the information identifying the properties of the network is stored in a data repository, and where the instructions further include:

one or more instructions to terminate communications between the network and the external source when the amount of the properties of the network, for which information is stored in the data repository, satisfies the threshold value.

16. The method of claim 1, where a format of the at least one of the one or more information templates comprises a plurality of rules for determining a presence and a value of at least one information element, and where comparing the response to the one or more information templates includes:

comparing the response to one or more of the plurality of rules to determine the properties, the one or more of the plurality of rules including one or more of:

a first rule that is based on a period of time associated with a packet associated with the response, a second rule that is based on a header of the packet, or a third rule that is based a protocol and a port associated with the packet.

17. The method of claim 4, where determining whether the amount of the properties satisfies the threshold value comprises:

determining that the amount of the properties satisfies the threshold value; and terminate communications between the network and the external source based on the determining that the amount of the properties satisfies the threshold value.

18. The non-transitory computer-readable medium of claim 8, where the threshold value is based on an amount of information profiles stored in a data repository, where each information profile, of the information profiles, is based on a respective response of a plurality of responses to inquiries received by the network, and where the information profiles identify a plurality of properties of the network.

19. The non-transitory computer-readable medium of claim 7, where the one or more instructions to store the at least a portion of the inquiry include:

one or more instructions to determine whether the inquiry is repetitive with respect to another inquiry from the external source, where the at least a portion of the inquiry is stored based on determining whether the inquiry is repetitive with respect to the other inquiry.

* * * * *